UNITED STATES PATENT OFFICE.

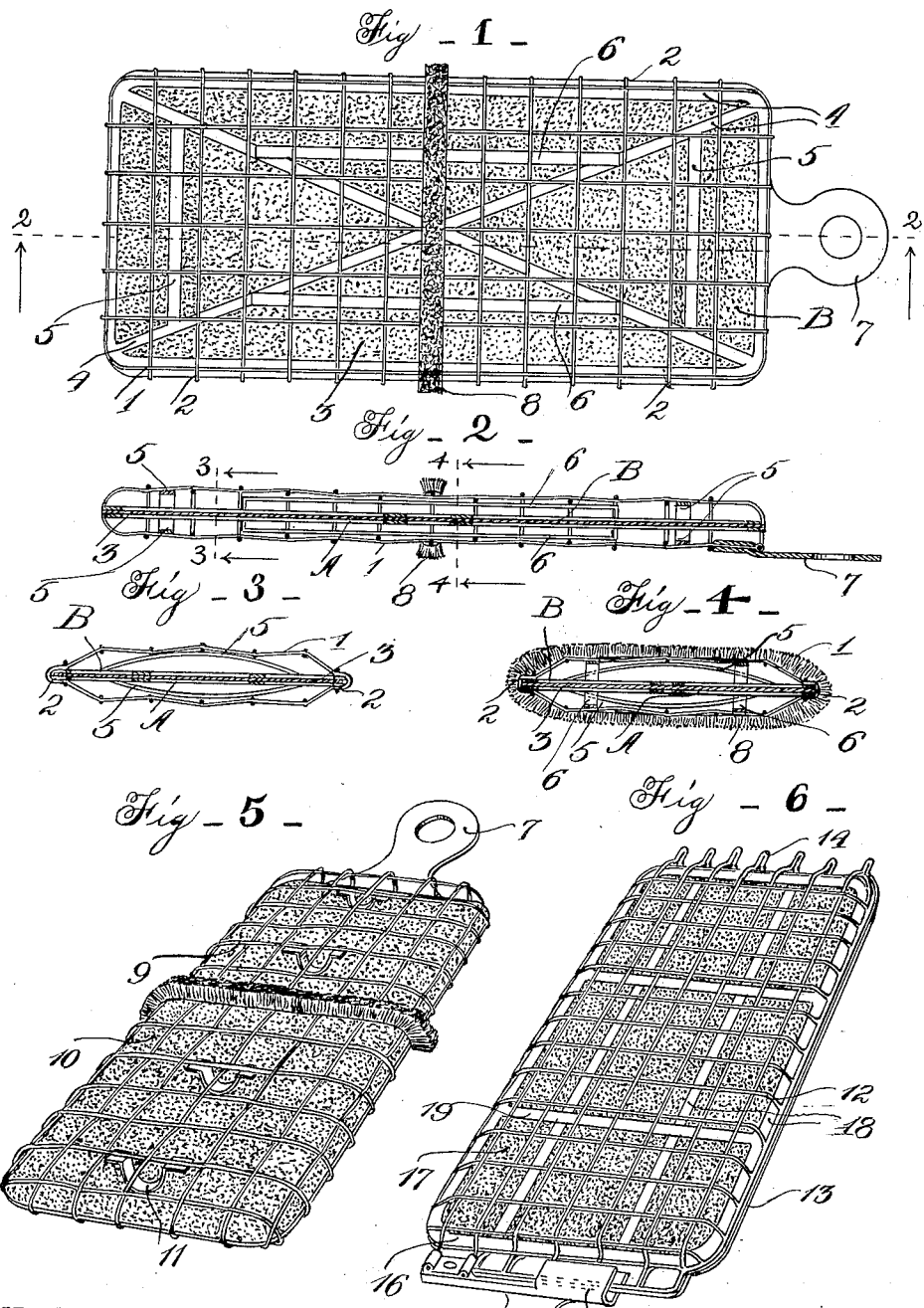

EMMER B. ARNOLD, OF LOS ANGELES, CALIFORNIA.

TRAP.

1,108,870. Specification of Letters Patent. Patented Aug. 25, 1914.

Application filed December 29, 1911. Serial No. 668,551.

*To all whom it may concern:*

Be it known that I, EMMER B. ARNOLD, a citizen of the United States, residing at Los Angeles, in the county of Los Angeles and State of California, have invented a certain new and useful Trap, of which the following is a specification.

My invention relates to an insect trap, and has for its objects to provide a portable device for catching fleas, mosquitos, and other insects, and for the convenient insertion of the trap under the clothing of a person or the covers of a bed.

The invention is illustrated in its preferable forms in the accompanying drawing, in which, Figure 1, is a plan view of the trap. Fig. 2, is a sectional elevation on lines 2—2, Fig. 1. Fig. 3, is a sectional elevation on lines 3—3, Fig. 2. Fig. 4, is a sectional elevation on lines 4—4, Fig. 2. Fig. 5, is a perspective view of a modified form, and Fig. 6, is a perspective view of another modified form.

The invention consists of a reticulated body or receptacle 1, of any suitable material, either rigid or flexible. Said body or receptacle is provided with grooves 2, to permit a sheet 3, of paper or other material, preferably coated on both sides with an insect trapping or killing substance, to be inserted in and withdrawn from the receptacle. As seen in Figs. 2, 3 and 4, the grooves 2, are provided approximately centrally of the receptacle, in order that the sticky sides of the sheet 3, may always be kept free and away from the walls of the receptacle, to the end that contact with the sheet will be prevented. While this sheet 3, may be inserted and used in the receptacle without any support or reinforcement, especially where the reticulated body is sufficiently strong to resist denting and crushing, I have deemed it advisable to provide an additional support or frame for the sheet, which will not only serve to strengthen the receptacle, but which will prevent the bending of the walls of the receptacle particularly where the trap is employed for personal use. This reinforcement or support consists of two frames A and B, composed of metal or other suitable strips 4. Each frame has curved bows 5, and rectangular bars 6, both bows 5 and bars 6, being arranged to lie in close proximity to the top and bottom of the receptacle. Between the two frames A and B, is placed the coated paper, fabric, or the like, and when thus assembled, is slid into the receptacle, where it is held free of and away from the walls of the body 1. If desired, a brush 8, may be provided on the receptacle to cause the insects with which it contacts to move and thereby entrap themselves. A handle 7, may also be provided to facilitate use of the trap.

In Fig. 5, I have shown a slightly modified form, the modification consisting of a reticulated structure 9, constituting substantially a support or holder for a sheet 10, of preferably stiff or very slightly resilient material, which is coated on but one side with an insect trapping substance. This sheet 10, forms the back of the structure 9, which holds the same free of its reticulated face. To insure, however, against crushing of the sheet, members 11, may be furnished, such members being low enough to admit of the easy insertion of the sheet in the structure 9.

In Fig. 6, the entire trap is flexible, and consists of two reticulated sides 12 and 13, conjoined at one end as seen at 14, while the other ends are held together in any suitable manner, as by a clip 15. Between two flexible frames 16, is interposed a sheet 17, having on both sides an insect trapping substance. The strips 18 and cross strips 19, which make up the frames 16, are sufficiently high to bear against the sides 12 and 13, when closed, as shown, and to hold the sheet 17, centralized.

While I have heretofore referred to a reticulated receptacle as constituting the holder or container for the trapping substance, I would have it understood that the term "reticulated" is employed in a generic sense, as embracing any structure that is intersticed or provided with openings, regardless of arrangement, size or material.

The insect trapping sheet described hereinbefore, is not to be understood as meaning a specific flat piece of material, used in its flat form. Where the form of the inclosing structure varies, the insect trapping body will also vary to conform to the contour of the body of the structure, and it is immaterial whether the trapping body consists of paper, or whether the trapping substance is applied to suitable holders for the same.

What I claim, is:—

1. A trap consisting of an insect trapping sheet, in combination with a reticulate envelop completely inclosing and surrounding said sheet, said sheet disposed centrally of said envelop and free of the walls thereof, and a brush attached to the outside of said envelop.

2. A trap consisting of a reticulate fabric forming a complete inclosure, an insect trapping body, and means to support said body centrally of said inclosure and free of the walls thereof, said means also serving to hold said walls spaced from said body.

3. A trap consisting of an insect trapping sheet, a reticulate inclosure for said sheet completely inclosing said sheet, a frame within and disposed centrally of said inclosure and supporting said sheet centrally and free of the walls thereof, said frame also serving to prevent contact of the walls with said body.

4. A trap comprising a hollow reticulate envelop of flexible material, an insect trapping body within said envelop and means to hold said body free of the walls thereof during flexures thereof.

5. A portable trap comprising a reticulate envelop having an insect trapping body disposed centrally therein and free of the walls thereof, said envelop completely enveloping said body on all sides.

In testimony whereof I affix my signature in the presence of two witnesses.

EMMER B. ARNOLD.

Witnesses:
J. E. ARNOLD,
F. J. McCLARY.

Copies of this patent may be obtained for five cents each, by addressing the "Commissioner of Patents, Washington, D. C."